Figure 1:
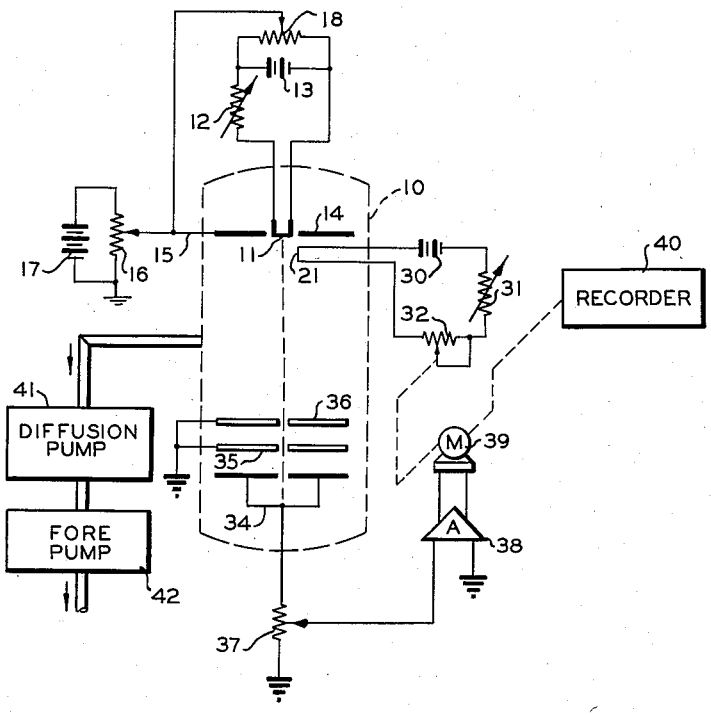

Feb. 21, 1961

T. D. MORGAN 2,972,716

ANALYTICAL INSTRUMENT UTILIZING IONIZATION
AND SELECTIVE EVAPORATION

Filed July 7, 1955

INVENTOR.
T. D. MORGAN

BY

*Hudson & Young*
ATTORNEYS

United States Patent Office 2,972,716
Patented Feb. 21, 1961

2,972,716

ANALYTICAL INSTRUMENT UTILIZING IONIZATION AND SELECTIVE EVAPORATION

Thomas D. Morgan, Idaho Falls, Idaho, assignor to Phillips Petroleum Company, a corporation of Delaware Filed July 7, 1955, Ser. No. 520,585

10 Claims. (Cl. 324—33)

This invention relates to analytical instruments utilizing ionization and selective evaporation.

Considerable difficulty is encountered in accurately determining the concentration of solutions to a high degree of accuracy without involved and extensive analytical testing procedures. The problem of determining the concentration of a material in solution arises in many industries. For example, in processing certain radioactive streams, such as a solution of uranium dioxide in nitric acid, it is important to rapidly determine the concentration of the uranium dioxide in the solution. As another example, in the fertilizer industry, it is desirable to accurately determine the quantity of phosphorus in the rock going into the process and also to test for phosphorus in the final product. Also, it is desirable to determine the calcium content of a waste calcium sulfate-containing slurry produced in the manufacture of superphosphate or triple superphosphate for fertilizers.

In accordance with this invention, the above and many other analyses are quickly and accurately carried out by mixing the solution containing an unknown amount of the material whose concentration is to be determined with a second solution, preferably having the same solvent, but having a known concentration of a different material dissolved therein. The mixed solution is placed on a filament which is electrically heated to drive off the solvent. Thereupon, this filament is placed adjacent a second filament maintained at a predetermined high temperature within an evacuated tube provided with a collector plate to which ions are attracted. The first filament (on which the material to be analyzed is deposited) is heated to a temperature at which one of the materials, say the material of known concentration, is evaporated. The temperature of this filament is further regulated to maintain a constant ion current resulting from passage of ions into the vicinity of the second filament and thence to the collector plate. The time during which this constant ion flow is maintained is determined. The first filament is then heated to a temperature at which the second material is evaporated, the temperature again being further adjusted to maintain a constant ion current. The time during which this second current flow is maintained is measured and compared with the first timed period to provide a relationship between the concentration of the known and unknown materials from which the concentration of unknown material can be readily calculated.

Accordingly, it is an object of the invention to provide an improved method of determining the concentration of a component in a solution.

It is a further object to provide improved apparatus to carry out such analyses.

It is a still further object to permit such analyses to be carried out rapidly and accurately without requiring time consuming and expensive analytical tests.

Figure 2:
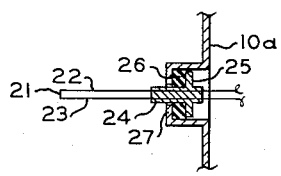

Various other objects, advantages and features of the invention will become apparent from the following detailed description taken in conjunction with the accompanying drawings, in which:

Figure 1 is a schematic view of an analytical instrument constructed in accordance with the invention; and Figure 2 is a detail view illustrating a feature of the invention.

Referring now to Figure 1, the instrument and its operation will be described in connection with the determination of an unknown quantity of uranium dioxide dissolved in nitric acid, from which the method of application of analyzing the solutions, such as phosphate solutions in the fertilizer industry, will readily become apparent.

In the figure, a glass envelope 10 of generally cylindrical shape with suitable closed ends has a filament 11 mounted therein which is connected in series with a variable resistance 12 and a battery 13. This filament can, for example, be formed from a 0.50" by .001" tungsten ribbon which can be heated by manipulation of variable resistor 12 to a predetermined high temperature, say 3000° C.

The filament 11 is surrounded by a guard ring 14 which is connected by a lead 15 to the contactor of a potentiometer 16 having a battery 17 connected to the fixed terminals thereof, the negative terminal of the battery being grounded. In the present example, the potentiometer 16 is adjustable to impress a predetermined positive potential upon the guard ring, and lead 15 is further connected to the contactor of a potentiometer 18 having its fixed terminals connected in parallel with the battery 13 so that the filament 11 is maintained at this same positive potential.

A second filament 21 is disposed within the envelope 10 and it is arranged so that it can be rapidly inserted into or withdrawn from the glass envelope. To this end, the filament 21, which can be formed from a tungsten ribbon as described in connection with filament 11, is secured to a pair of stiff conductor rods 22 and 23, Figure 2, which are fixedly secured within a plug 24 of refractory insulating material. The plug 24 has an integral flange 25 which bears against a sealing gasket 26 fitted within a recessed portion 27 formed in the envelope 10a of the tube. It will be evident that the plug and the filament can be simply lifted out of the tube when the interior thereof is at atmospheric pressure. However, when the tube is evacuated, the flange 25 bears against the gasket 26 to seal the portion of the envelope surrounding the plug, and securely holds the filament in position within the tube. Thus, the filament 21 is readily insertable into and removable from the tube.

Referring again to Figure 1, it will be noted that the filament 21 is connected in series with a battery 30, a variable resistor 31 by which a coarse adjustment of the filament temperature can be obtained, and a variable resistor 32 of substantially lower ohmic value than resistor 31. The variable resistor 32 is thus adjustable to obtain a fine temperature adjustment of the filament 21.

Also mounted interiorly of the tube is a collector electrode 34 and a pair of slotted guide electrodes 35 and 36. These guide electrodes 35 and 36 have parallel aligned slots which may be, for example, 0.05" long and 0.001" wide.

The collector electrode 34 is connected through a current source to ground through a potentiometer 37, the contactor of which is connected to one input terminal of an amplifier 38, the other input terminal of which is grounded. The output terminals of the amplifier are connected to a servomotor 39 having a rotatable shaft which is mechanically connected to the contactor of variable resistance 32 and to a recorder 40.

The interior of the tube 10 can be evacuated by a diffusion pump 41 connected to a fore pump 42.

In operation, the solution of uranium dioxide, in unknown concentration, in nitric acid is mixed with a known amount of a solution of a different material, for example, copper dissolved in nitric acid to form a solution of known concentration. The mixed solution is placed upon the filament 21 which is inserted into the envelope 10, and the filament 21 is heated to a temperature which is high enough to drive off the solvent. Thereupon, the interior of the envelope is evacuated by operation of pumps 41 and 42, and filament 11 is heated to a high temperature, say 3000° C.

Variable resistor 31 is adjusted to raise the temperature of filament 21 to that at which the more volatile component is evaporated therefrom. In the present example, the copper is driven off first when the temperature of filament 21 reaches about 1800° C. Positive copper ions resulting from evaporation of the copper into the vicinity of filament 11 are attracted to the collector electrode 34, passing thereto through the slits in electrodes 35 and 36. This produces a potential across potentiometer 37, a portion of which is applied to the input of amplifier 38.

As a result, servomotor 39 operates variable resistor 32 in such fashion as to regulate the temperature, and hence the rate of evaporation of the copper from the filament 21, to maintain a constant ion current through the potentiometer 37, the magnitude of which can be regulated by adjustment of this potentiometer. Thus, the copper is withdrawn from filament 21 at a constant rate until no more is left on the filament whereupon the ion current abruptly drops. The length of this period can, of course, be readily determined by inspection of the chart of recorder 40.

After the copper has all been evaporated from the filament 21, its temperature is raised to a higher value at which the second component is evaporated from the filament. In the present example, the uranium is evaporated off at a temperature of about 2500° C., and variable resistor 32 is adjusted by the servomotor 39 to maintain a constant ion current through the tube which continues until all of the uranium is evaporated from the filament, whereupon the ion current abruptly drops. The length of the period during which this constant ion current flows is again readily determinable from the chart of recorder 40.

It will be evident that comparison of the length of these two periods enables the unknown concentration of uranium dioxide in the nitric acid solution to be readily determined since the amounts of the two solutions, and the copper concentration are both known. In fact, calculations can be avoided altogether by calibrating the instrument originally with a solution of a known concentration of uranium dioxide. Thereafter, the concentration of uranium dioxide in unknown amounts can be determined by inspection of the chart, provided that the relative amounts of the two solutions admixed are equal and the same concentration of copper solution is used. Thus, a very rapid and accurate analysis can be made in considerably less time than would be required for the usual laboratory procedures.

Further, it will be evident that the technique and apparatus of the invention are applicable to various other analyses. For example, in the manufacture of triple superphosphate fertilizer, the phosphate rock is reacted with acid in the initial step. Here, the quantity of phosphate in the solution can be determined by the technique of the present invention using, for example, copper dissolved in known concentration in the same acid as the comparison solution. Furthermore, the concentration of phosphorus in the fertilizer product can be determined by dissolving it in a suitable solvent and using a salt of different evaporation point as the standard material. Finally, in the manufacture of this same fertilizer material, a by-product stream of calcium sulfate is provided, and the technique of this invention can be advantageously utilized to determine the concentration of calcium in this stream, again for example, utilizing copper dissolved in sulfuric acid as the comparison solution.

The foregoing examples illustrate the general application of the present apparatus and analytical technique to the determination of the unknown concentration of materials in solutions utilized in various chemical and other industries.

While the invention has been described in connection with a present, preferred embodiment thereof, it is to be understood that this description is illustrative only and is not intended to limit the invention.

I claim:

1. The method of determining the concentration of a component in a solution which comprises mixing said solution with a second solution containing a second component dissolved therein in known concentration, depositing a quantity of the mixed solution upon a filament, heating said filament in an evacuated zone in the presence of a second filament maintained at a predetermined high temperature, collecting the resulting ions, regulating the temperature of said first filament in accordance with said ion current to maintain said ion current at a predetermined value, raising the temperature of said first filament to a higher value at which the second component is given off after said flow of said ion current drops off, collecting ions resulting from evaporation of said second component, and regulating the temperature of said first filament in accordance with the magnitude of the second resulting ion current to maintain said second current at a predetermined value.

2. The process of claim 1 wherein the first solution is uranium dioxide dissolved in nitric acid and the second solution is copper dissolved in nitric acid in known concentration.

3. The process of claim 1 wherein the first solution is phosphate rock dissolved in acid selected from the group consisting of sulfuric acid and phosphoric acid, and the second solution is a metal dissolved in the same acid.

4. The process of claim 1 wherein the first solution is phosphate fertilizer dissolved in a solvent and the second solution is a metal dissolved in the same solvent.

5. The method of claim 1 wherein the first solution is a slurry of calcium sulfate and the second solution is a metal dissolved in sulfuric acid.

6. The method of determining the concentration of a component in a solution which comprises mixing said solution with a second solution containing a second component dissolved therein in known concentration, depositing a quantity of the mixed solution upon a filament, heating said filament to a temperature sufficient to volatilize said solvent but insufficient to drive off either of said components, thereafter heating said filament in an evacuated zone in the presence of a second filament maintained at a predetermined high temperature, collecting the resulting ions, regulating the temperature of said first filament in accordance with said ion current to maintain said ion current at a predetermined value, raising the temperature of said first filament to a higher value at which the second component is given off after said flow of said ion current drops off, collecting ions resulting from evaporation of said second component, and regulating the temperature of said first filament in accordance with the magnitude of the second resulting ion current to maintain said second current at a predetermined value.

7. The method of determining the unknown concentration of a component in a solution which comprises mixing said solution with a second solution having the same solvent as the first solution and containing a second component dissolved therein in known concentration, depositing a quantity of the mixed solution upon a filament, heating said filament to a temperature sufficient to volatilize said solvent but insufficient to drive off either of said components, thereafter heating said filament in an evacuated zone in the presence of a second filament maintained at a predetermined high temperature, collecting the resulting ions, regulating the temperature of said first filament in accordance with said ion current to maintain said ion current at a predetermined value, raising the temperature of said first filament to a higher value at which the second component is given off after said flow of said ion current drops off, collecting ions resulting from evaporation of said second component, regulating the temperature of said first filament in accordance with the magnitude of the second resulting ion current to maintain said second current at a predetermined value, and comparing the length of the ion collection periods to determine said unknown concentration.

8. In an analytical instrument, an envelope, means for evacuating said envelope, a pair of filaments within said envelope, a collector electrode in said envelope, means for supplying a first predetermined heating current to one filament, means for supplying a heating second current to said second filament, means for making a coarse adjustment of said second heating current, and means including a variable impedance for making a fine adjustment of said second heating current, an amplifier having its input terminals connected to said collector electrode so as to be responsive to an ion current passing through said tube, a servomotor connected to the output of said amplifier, a recorder driven by said motor, and means mechanically connecting said motor to said variable impedance to maintain a constant ion current through said tube.

9. In an analytical instrument, an envelope, means for evacuating said envelope, a pair of filaments within said envelope, a collector electrode in said envelope, a pair of grounded guide electrodes disposed within said envelope between said filaments and said collecting electrode, said guide electrodes having aligned parallel slits therein to direct an ion current from the filaments to said collector electrode, means for supplying a first predetermined heating current to one filament, means for supplying a heating second current to said second filament, means for making a coarse adjustment of said second heating current, and means including a variable impedance for making a fine adjustment of said second heating current, an amplifier having its input terminals connected to said collector electrode so as to be responsive to an ion current passing through said tube, a servomotor connected to the output of said amplifier, a recorder driven by said motor, and means mechanically connecting said motor to said variable impedance to maintain a constant ion current through said tube.

10. In an analytical instrument, an envelope, means for evacuating said envelope, a pair of filaments within said envelope, a collector electrode in said envelope, a pair of grounded guide electrodes disposed within said envelope between said filaments and said collector electrode, said guide electrodes having aligned parallel slits therein to direct an ion current from the filaments to said collector electrode, a guard electrode in said envelope substantially surrounding one filament and connected to said one filament so as to be maintained at same potential as said one filament, and volatilizable material to be analyzed on the other filament.

References Cited in the file of this patent

UNITED STATES PATENTS

| | | |
|---|---|---|
| 253,770 | Sebillot | Feb. 14, 1882 |
| 1,690,056 | Coleman | Oct. 30, 1928 |
| 1,716,155 | Smede | June 4, 1929 |
| 1,914,883 | Cottrell | June 20, 1933 |
| 2,211,325 | George | Aug. 13, 1940 |
| 2,265,608 | Marti | Dec. 9, 1941 |
| 2,417,213 | Picard | Mar. 11, 1947 |
| 2,560,952 | Herold | July 17, 1951 |
| 2,576,616 | Livingston et al. | Nov. 27, 1951 |
| 2,796,555 | Connor | June 18, 1957 |
| 2,854,625 | Dudley et al. | Sept. 30, 1958 |